July 29, 1969
L. L. POLSON
3,458,801
HIGH VOLTAGE OPERATIONAL AMPLIFIER FOR USE AS AN
ELECTRONICALLY CONTROLLABLE POWER
SUPPLY REGULATOR
Filed June 1, 1967
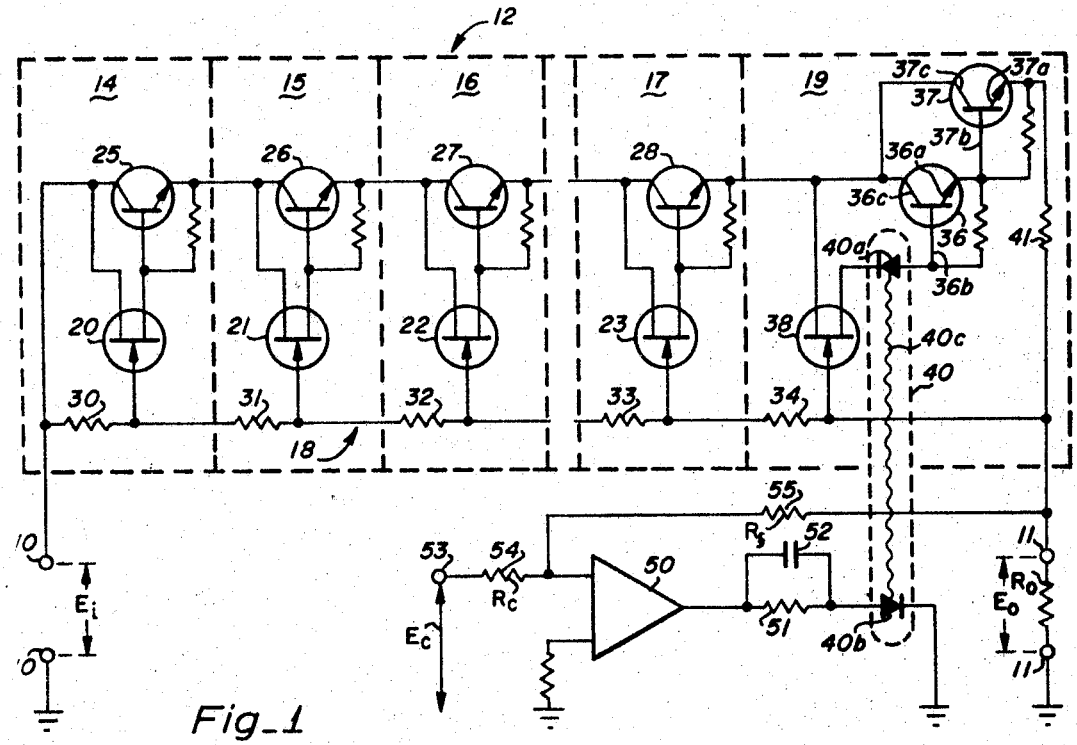
Fig_1
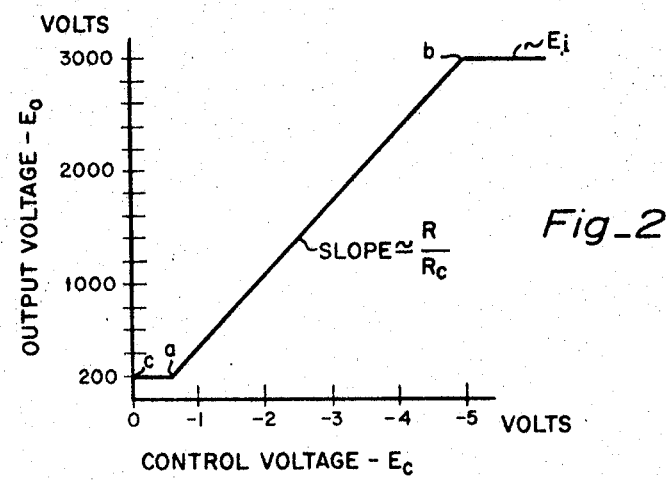
Fig_2
INVENTOR
LAWRENCE L. POLSON
BY Harvey J. Lowhurst
ATTORNEY

United States Patent Office 3,458,801
Patented July 29, 1969

---

3,458,801
HIGH VOLTAGE OPERATIONAL AMPLIFIER FOR USE AS AN ELECTRONICALLY CONTROLLABLE POWER SUPPLY REGULATOR
Lawrence L. Polson, Santa Clara, Calif., assignor, by mesne assignments, to Itek Corporation, Lexington, Mass., a corporation of Delaware
Filed June 1, 1967, Ser. No. 642,777
Int. Cl. G05f 1/44
U.S. Cl. 323—21    9 Claims

ABSTRACT OF THE DISCLOSURE

An electrically controllable high power supply regulator which employs a series pass section including a plurality of pass segments to divide the voltage into a plurality of equal voltage drops, and a variable conductance control segment connected in series with the last pass segment to vary the conductance of the current path. The control segment is controlled through a photon coupled isolator connected to the output of an operational amplifier to vary the conductance of the control segment in accordance with a control signal applied to the operational amplifier. The regulated voltage is developed at the output of the series pass section.

BACKGROUND OF THE INVENTION

Field of the invention

This invention relates in general to electronically controllable power supply regulators, and more particularly to an electronically controllable voltage source of the operational amplifier type capable of handling the adjustment of the output voltage over a wide range.

Description of the prior art

The high voltage power supply regulators of the prior art have been either of the vacuum tube type or the solid state DC to DC converter type which, even though capable of handling relatively high voltage, do have certain shortcomings, particularly when employed to supply the control voltage to such devices as traveling wave tubes, klystrons and backward wave oscillators. Vacuum tube circuits are objectionable because of their large size, lower efficiency, cooling requirements, relatively low reliability and ruggedness, susceptibility to unwanted noise and hum pick-up, and the fact that they require supplementary filament power supplies. The solid state DC to DC converters are free from most of the above disadvantages of the vacuum tube circuit, but they do have other shortcomings, such as their relatively slow rate of response to modulating control signals, their relatively high ripple and noise output, and the fact that they are sources of wide-band radio interference.

SUMMARY OF THE INVENTION

In accordance with this invention, there is provided an electronically controllable high voltage power supply regulator of the operational amplifier type which eliminates all of the above problems of the vacuum tube regulators and the solid state DC to DC converters. In the device of this invention, a series pass section is provided which includes, a plurality of pass segments each of which has a field effect transistor, a control segment which likewise has a field effect transistor, and a voltage divider network which controls the field effect transistors of each segment. The voltage divider network is connected between the high voltage input circuit and the regulated voltage output circuit (load) to evenly distribute the voltage drop across the segments, thus reducing the voltage drop across any segment to a value which is much less than the difference between the input and the output voltage. To provide a current path capable of delivering high power, each of the pass segments is further provided with a transistor whose base is controlled by the source electrode of the field effect transistor. This allows the use of inexpensive transistors because the voltage drop across each load current conducting transistor is maintained small by the voltage dividing network.

The control segment of the series pass section is controlled by the output of a photon coupled isolator. The control current for the photon isolator is supplied from an operational control amplifier which receives an input control voltage for determining the output voltage of the device. Through the use of the photon coupled isolator, the high voltage output of the regulator may be controlled by a control voltage (or signal) in a separate and electrically isolated circuit. This isolation permits the use of an operational amplifier, with its resultant precision control.

It is therefore an object of this invention to provide an improved solid state electronically controllable high voltage power supply regulator.

It is another object of this invention to provide an electronically controllable high voltage power supply regulator which permits the output voltage to be controlled between a range extending from a low residual output voltage to an output voltage which is approximately equal to the unregulated input voltage diminished by the saturation voltages of the segments.

It is a further object of this invention to provide a high voltage power supply regulator in which the power delivered to a load is distributed substantially equally over a number of load current carrying transistors. This is accomplished by dropping the voltage across each load current carrying transistor to a small fraction of the total series pass section voltage drop.

It is still a further object of this invention to provide a high voltage power supply in which the voltage drop across all pass segments is maintained equal.

It is a further object of the present invention to provide a high voltage power supply regulator having a series pass section comprising a plurality of load transistors which are controlled by a voltage divider network which is connected between the high voltage input terminal and the high voltage output terminal, with a photon coupled isolator controlling the conductance of the control segment in the output stage of the pass section in response to a signal from a circuit which is electrically isolated from the high voltage pass section.

It is an additional object of this invention to provide a high voltage power supply regulator which is small, lightweight, efficient, easy to cool, relatively unsusceptible to hum and noise pick-up, does not generate radio frequency interference, has very low output noise and a very high frequency response.

Objects and advantages other than those set forth above will be readily apparent from the following description when read in connection with the accompanying drawing, in which:

BRIEF DESCRIPTION OF THE DRAWING

FIG. 1 is a schematic diagram of the preferred embodiment of the regulator of this invention; and FIG. 2 is a graph illustrating the variation of the regulated output voltage as a function of the control voltage.

DESCRIPTION OF THE PREFERRED EMBODIMENT

Referring to FIG. 1, the unregulated high voltage input $E_i$ is applied across a pair of input terminals 10, forming the input circuit, one of which may be grounded as shown. The regulated high voltage output $E_o$ appears across a pair of output terminals 11, forming the output circuit, one of which may be grounded as shown.

The input voltage $E_i$ is applied to a high voltage solid state pass section 12 which comprises a plurality of similar series-stacked pass segments 14, 15, 16 and 17, a high impedance voltage divider network 18 and a control segment 19. Each pass segment includes a high voltage n-channel junction field effect transistor (FET) source follower and a NPN transistor emitter follower whose base electrode is controlled by the field effect transistor. The field effect transistors are identified by reference characters 20, 21, 22 and 23 while the emitter follower transistors are identified by reference characters 25, 26, 27 and 28. The particular number of pass segments illustrated in FIG. 1 is not to be considered the ideal number, since this number depends entirely on the magnitude of the input voltage $E_i$ and the desired maximum voltage drop across each transistor. If the maximum desired voltage drop across each pass segment is to be limited to say 150 volts, and the input voltage $E_i$ is 3,000 volts, the number of pass segments selected would be about 20.

The drain electrode of each field effect transistor and the collector electrode of each associated emitter follower transistor are commonly connected at the positive side of each pass segment and form the input side of a pass section. The transistor emitter electrodes then form the output side of the pass section. The pass segments are connected in series between the positive input terminal 10 and the control segment 19.

The gates of the different field effect transistors 20–23 are connected to successive junctions of a high impedance resistive voltage divider having a plurality of resistive segments 30, 31, 32, and 33, which are each very large, typically greater than 0.1 megohm. This voltage divider is connected directly between the positive high voltage input terminal 10 and the positive high voltage output terminal 11. Each of resistive segments 30–33 is preferably equal in resistive value so that the voltage divider distributes the voltage drop equally across the individual resistive segments of the pass section. This use of the voltage divider circuit reduces the voltage across any one transistor (field effect and ordinary), thus permitting the use of relatively inexpensive transistors rather than the expensive very high voltage types. Further, the use of field effect transistors for coupling the voltage divider network to the load current carrying transistors effectively isolates the voltage divider network from the load current carrying transistors so that the voltage drop distribution along the divider network remains unaffected by the current supplied to the load.

The output control circuit of the pass section is control segment 19 which is similar to the pass segments except that it includes, a smaller resistive segment 34 to provide a voltage drop of reduced magnitude, and a pair of Darlington-connected transistors rather than the single transistor of the preceding segments. These Darlington-connected transistors are identified by reference characters 36, 37 and have emitters 36a, bases 36b, 37b and collectors 36c and 37c. As is well-known in the art, in the Darlington connection collectors 36c and 37c are connected in common, while emitter 36a is connected to base 37b.

The control segment 19 also includes a silicon PIN photondetector diode 40a of a photon coupled isolator 40. Isolator 40 may be of any suitable type, such as the HPA 4301, manufactured by Hewlett-Packard Associates. This photondetector diode is connected between base 36b of transistor 36 and the source electrode of a field effect transistor 38. The gate electrode of control segment field effect transistor 38 is connected to the output end of voltage divider network 18 to have applied thereto the output voltage $E_o$. Thus, field effect transistor 38 is source biased by the conduction level of photondetector diode 40a, so that the conduction level of this photondiode determines the source current of transistor 38, which is the base drive current for the Darlington-connected transistor 36, and also determines the output voltage to the load resistor $R_o$. A resistor 41 may be added between the output of the Darlington-connected transistors and the load resistor $R_o$ for overload protection. It will be seen that the output current limits when the total self-bias of the control segment field effect transistor 38 nears pinch-off.

Phontondetector diode 40a is illuminated by an electrically isolated gallium arsenide diode 40b in photon coupled isolator 40. The radiation from photonemitter diode 40b is guided by means of a light fiber or light pipe, represented by the wavy arrow 40c, into the photondetector diode 40a. The electrical conduction of photondiode 40a is thus controlled by an input in a separate and electrically isolated circuit.

The control current for the photon coupled isolator 40 is supplied by an operational control amplifier 50 through an RC stabilizing network comprising a resistor 51 and a capacitor 52. Control amplifier 50 receives a controlling input signal through an input resistor $R_c$, identified by reference character 54, from a control voltage input applied to a control input terminal 53. Amplifier 50 also receives a feedback signal supplied from the output circuit through a feedback resistor $R_f$, identified by character 55.

Variations in the control voltage input, applied to terminal 53, vary the output voltage of amplifier 50 to vary the current supplied photonemitter diode 40b to thus vary the radiation output therefrom. This radiation is supplied to photondetector diode 40a to vary the electrical properties thereof in control segment to thus produce a variation in the regulated output voltage across load resistor $R_o$.

Graph of FIG. 2 illustrates the relationship between the output voltage $E_o$ appearing across load resistor $R_o$ with variations in the control voltage input $E_c$ applied to terminal 53. It will be seen that this graph has a linear slope throughout its operating range $a$ to $b$ which is a function of the ratio of the feedback resistance $R_f$ to the input resistance $R_c$.

In operation, the electronically controlled power supply regulator of this invention behaves as an operational amplifier. The circuit is in equilibrium when the output voltage $$E_o \cong -E_c \frac{R_f}{R_i}$$

The circuit will always seek its equilibrium point whenever it is operated within the linear range of its operating characteristic as shown in FIG. 2. When $E_c=0$, the circuit will operate outside its linear range at point $c$ of FIG. 2. Under these conditions, no current is applied to photonemitter diode 40b and consequently photondetector diode 40a will not supply driving current to the Darlington-connected transistors 36 and 37. The small output voltage indicated at point $c$, FIG. 2, is due to a small current to load $R_o$ through the high impedance voltage divider 18 (resistive segments 30 through 34). Under these conditions all load current carrying transistors, 25 through 28, and 37 will not conduct and the output voltage is at a minimum.

If the input central voltage $E_i$ is changed from zero to say −4 volts, operational amplifier 50 will supply current to the photonemitter diode 40b which, in turn, turns on photondetector diode 40a. Diode 40a thereby furnishes base current to transistor 36 of the Darlington-connected transistors and output current will now flow to the load $R_o$ through the series transistor string 25 through 28 and 37. The output voltage will increase until an equilibrium condition exists where $$E_o \cong -E_c \frac{R_f}{R_i}$$

The total voltage drop between input terminal 10 and output terminal 11 is distributed equally along the resistive segments 30 through 33 of voltage divider network 18. By the action of source follower field effect transistors 20 through 23 and 38, an equal distribution of voltages across the field effect transistors and therefore across gate electrodes of the load current transistors 25 to 28 is maintained. By emitter follower action, equal voltage distribution across the load current transistors 25 through 28 themselves is maintained. Since the field effect transistors are voltage controlled devices, there is no loading on high impedance voltage divider 18, and thus the equal distribution of voltage across the pass segments is maintained under all conditions of operation.

Assume, by way of an example, that the input voltage $E_i$ is 3,000 volts and that the input control voltage is zero. Accordingly, the control segment remains turned off and the input voltage is equally distributed across resistive segments 30 to 33, neglecting the smaller drops across resistive segment 34 and the load $R_o$. Assuming a series pass section of twenty pass segments, each resistive segment would have a voltage drop of 150 volts thereacross.

Assuming next that a regulated output voltage of 2,000 volts is desired which, as determined from the graph of FIG. 2, requires a control voltage of −4 volts. The voltage drop across the entire voltage divider is now 1,000 volts so that the drop across each individual resistive segment is 50 volts. This is also the voltage (to a close approximation) appearing across each of the load current transistors 25 through 28. Assuming a load current of 20 milliamps, it is seen that, as a result of the series pass section, each load current transistor supplies power of only 1 watt which is well within the power rating of inexpensive transistors and which is readily dissipated without special cooling equipment.

From the foregoing, it will be seen that there is provided a high voltage power supply regulator which provides all the advantages of a solid state device without requiring the use of expensive high voltage and high power transistors. Further, through the use of the photon coupled isolator, an operational control amplifier, with its attendant advantages of precision, may be used to control the regulator output while being electrically isolated from the high voltage portion of the regulator.

It will be apparent that the output voltage and current capabilities of the regulator are easily adjustable, such as by adding additional pass segments for increased voltage capabilities and increased power dissipation. For increased current capabilities, power transistors, or Darlington amplifiers, or combinations of these, may be used as the emitter followers of the pass segments. Additionally, the regulator may have a negative or bi-directional output if a negative high voltage source is added and connected through a resistance to the control circuit output.

What is claimed is:

1. An electronically controllable high voltage power supply regulator for regulating the voltage supplied from a high voltage input circuit to a high voltage output circuit, comprising:

a high voltage series pass section including a plurality of pass segments, a high impedance resistive voltage divider and a variable conductance control segment;

said voltage divider being connected between said input circuit and said output circuit;

said pass segments being serially connected between said input circuit and one side of said control segment, each of said pass segments including a field effect transistor;

means connecting each of the field effect transistors of said pass segments to different points along said voltage divider to distribute the voltage appearing across said voltage divider across said pass segments;

the other side of said control segment being connected to said output circuit; and control means electrically isolated from said pass section for varying the electrical conductance of said control segment in accordance with a control signal to regulate the voltage appearing at said output circuit.

2. A regulator in accordance with claim 1 in which each pass segment further includes a load current carrying transistor and in which the base electrode of the load current carrying transistor in each pass segment is connected to the source electrode of the field effect transistor in that pass segment.

3. A regulator in accordance with claim 1 in which different points along said voltage divider, to which said field effect transistors are connected, are selected to distribute the voltage equally across said pass segments.

4. A regulator in accordance with claim 1 in which said control means includes a photon coupled isolator having its photodetector diode connected into said control segment for controlling the conductance of said control segment, and having its photonemitter diode controlled to regulate the voltage appearing at said output circuit.

5. A regulator in accordance with claim 4 in which said control means further includes an operational amplifier having an input circuit and an output circuit, said photonemitter diode being connected to the output circuit of said amplifier and said control signal and the output voltage from said regulator being applied to the input circuit of said amplifier.

6. A regulator in accordance with claim 5 in which said control segment includes a pair of Darlington connected transistors, said photodetector diode being connected between the source electrode of the field effect transistor in said control segment and the gate electrode of one of said Darlington connected transistors.

7. A regulator in accordance with claim 6 in which each pass section includes an emitter follower connected transistor having a base electrode, said base electrodes being coupled to the source electrodes of the associated field effect transistors.

8. A regulator in accordance with claim 6 in which each pass section further includes a load current carrying transistor having an emitter, collector and base electrode, each base electrode being connected to the source electrode of the field effect transistor in each pass segment and the emitter electrode of the transistor in one pass segment being connected to the collector electrode of the transistor in the immediately adjacent pass segment.

9. A regulator in accordance with claim 7 in which said collector electrodes are coupled to the drain electrodes of the associated field effect transistors.

References Cited

UNITED STATES PATENTS 3,160,807  12/1964  Packard.
3,174,093  3/1965  Finkelstein.

JOHN F. COUCH, Primary Examiner

A. D. PELLINEN, Assistant Examiner

U.S. Cl. X.R.

307—304, 311; 323—22